May 6, 1947.  L. W. LESSLER  2,420,141
PHOTOGRAPHIC PRINTER
Filed Oct. 30, 1943  4 Sheets-Sheet 3
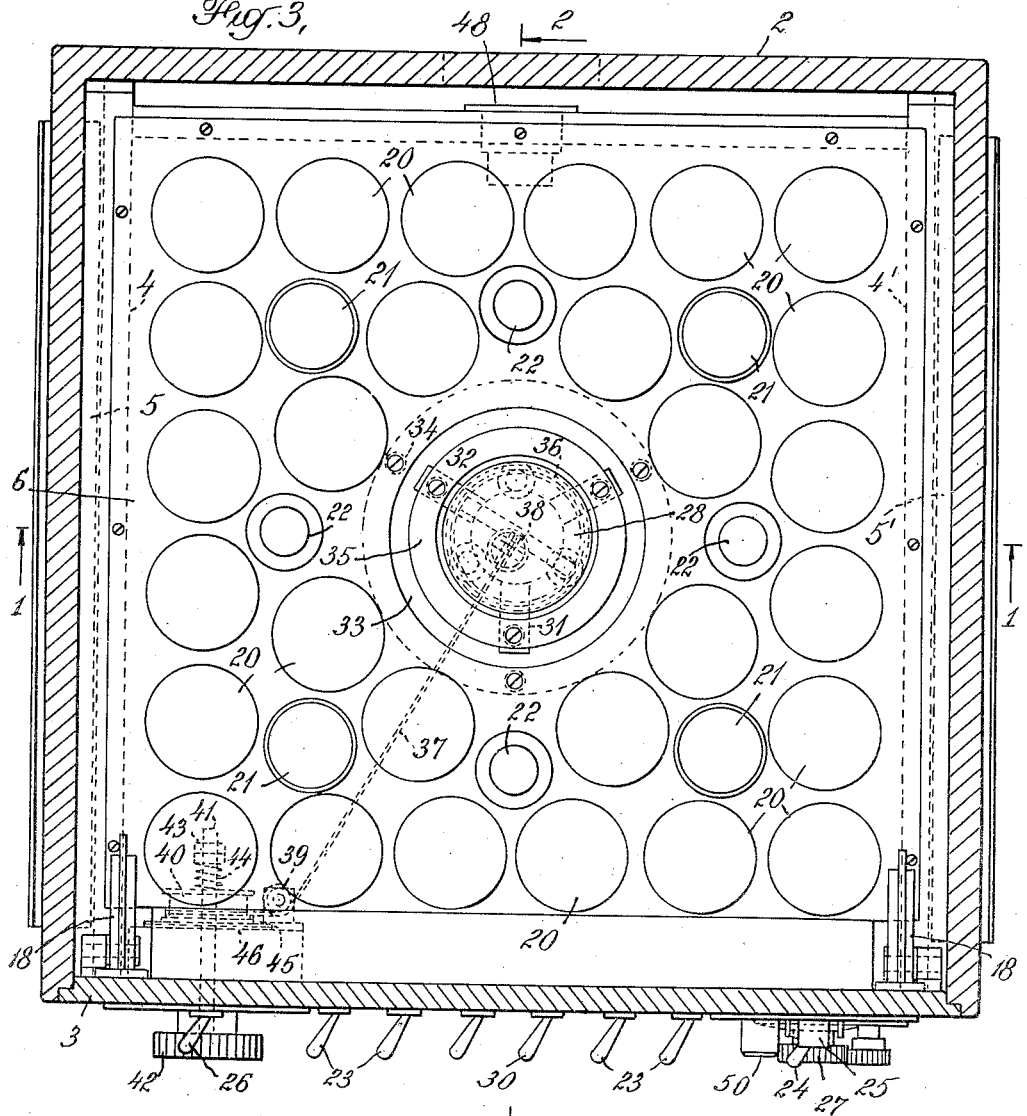
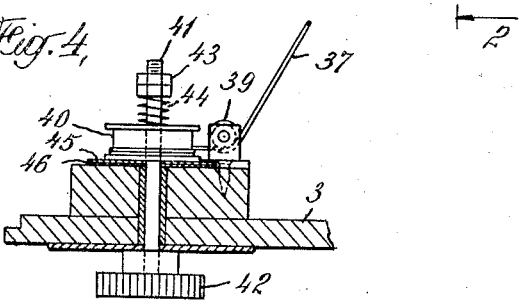
INVENTOR
Lew W. Lessler
BY
Henry W. Coughlin
ATTORNEY

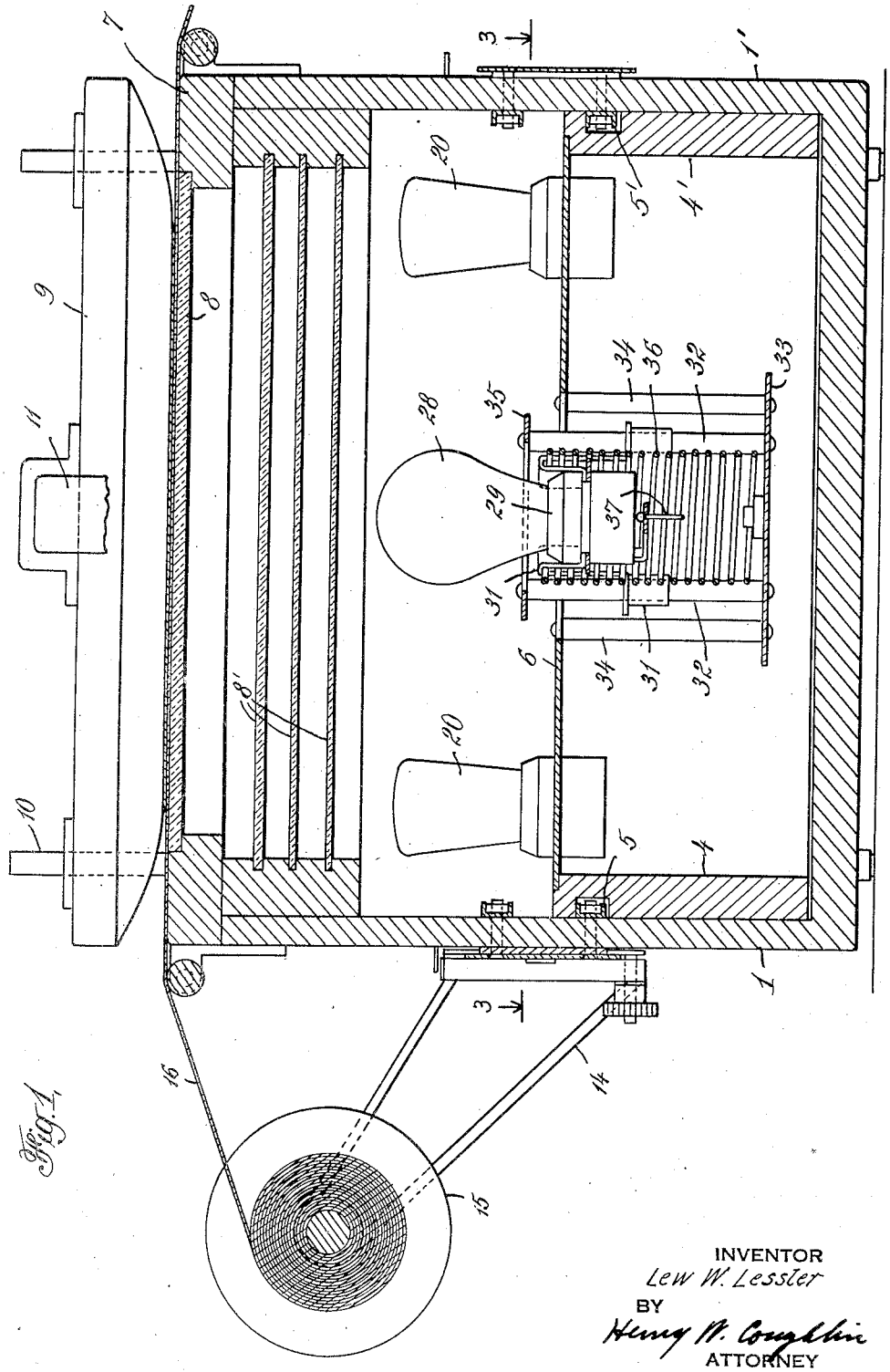

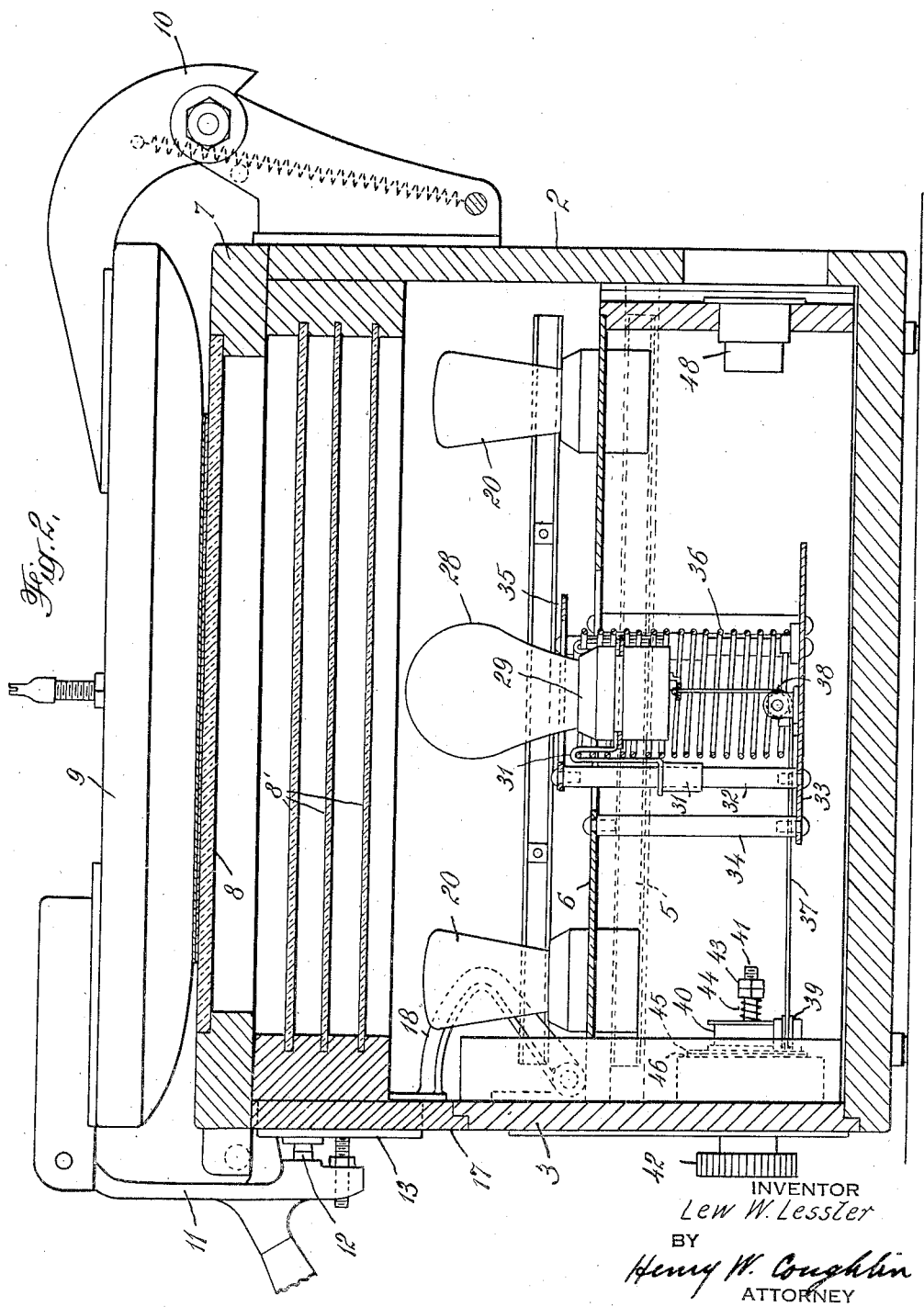

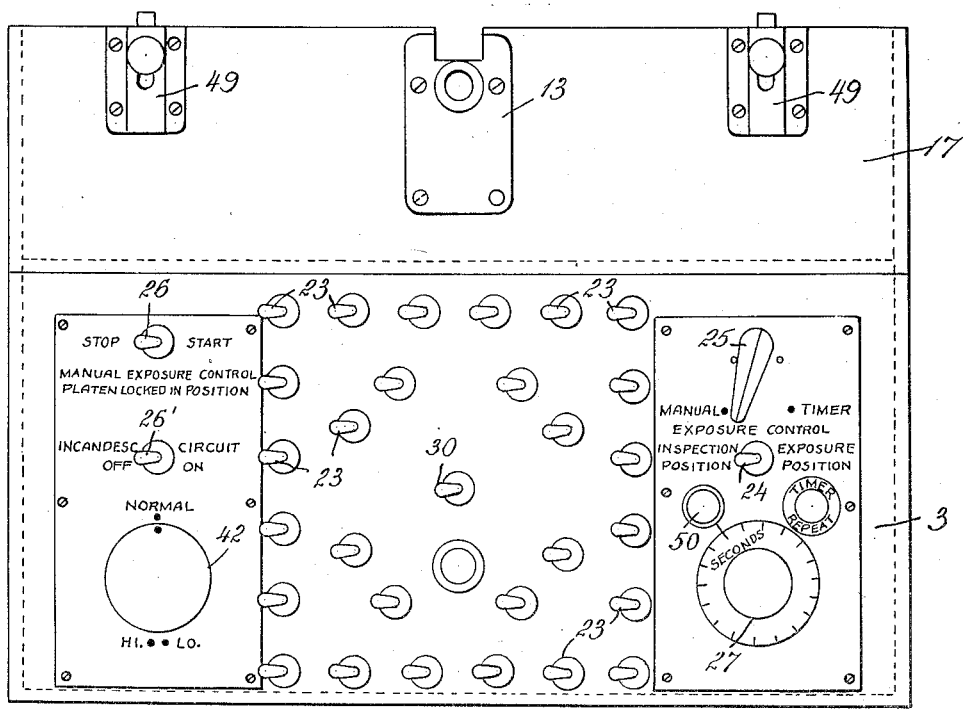

Patented May 6, 1947

2,420,141

UNITED STATES PATENT OFFICE 2,420,141

PHOTOGRAPHIC PRINTER

Lew W. Lessler, Binghamton, N. Y., assignor to General Aniline & Film Corporation, New York, N. Y., a corporation of Delaware Application October 30, 1943, Serial No. 508,276

7 Claims. (Cl. 95—75)

The present invention relates to a photographic printer and is particularly concerned with a device of this character for making contact prints from negatives made with a wide angle lens camera. The average negative made by using a camera provided with a wide angle lens has a considerable over-exposed portion in its central area and, in order to produce satisfactory prints from such negatives, it is necessary to provide stronger illumination for this central portion of the negative than for the portions around the edges of the negative. Heretofore, this has been accomplished by use of hand controlled spotlights and the like which required considerable skill on the part of the operator and considerably slowed down the making of the prints.

It is an object of this invention, therefore, to provide a photographic printer having contained in it means for providing adjustable illumination near the center of the negative. A further object of the invention is to provide a printer which may be employed as any ordinary printer. Still another object is to provide a printer in which the illumination unit forms a complete independent assembly which may readily be removed from the printer for inspection, replacement of lights and the like. Other and further objects will be apparent as the present description progresses.

A preferred embodiment of the prints of the present invention is illustrated in the accompanying drawings, in which:

Fig. 1 is a front elevation, in section, of the printer of the present invention taken on the line 1—1 of Fig. 3.

Fig. 2 is a side elevation, in section, of the printer embodied in the present invention taken on the line 2—2 of Fig. 3.

Fig. 3 is a plan view, in section, of the printer taken on the line 3—3 of Fig. 1.

Fig. 4 is a detail of a reel for controlling the elevation of the central lamp; and Fig. 5 is a front elevation of the front panel of the printer.

Referring now to the drawings, the cabinet of the printer is formed of side walls 1 and 1' and a rear wall 2. The front of the printer is closed by the front panel 3 of a drawer-like member on which the illumination unit is mounted, as is described more fully hereinafter. The top of the printer 7 has a ground glass or other device medium 8 set in a central opening to serve as a support for the film and sensitized paper. A conventional platen 9 is hinged to rear wall 2 of the cabinet of the printer by hinges 10 and is adapted to be moved toward and away from the ground glass 8 to press the paper and negative. A latch 11 is provided to hold the platen in closed position and when the latch 11 is locked, the projection 12 thereon operates switch 13 to close the circuit to the lights. Suitable brackets 14 may be mounted on the side wall 1 of the cabinet to support a roll of film which it is desired to print. One of these brackets is illustrated in Fig. 1 and supports a roll 15 of film 16.

Grooved slide-ways may be provided in the upper portions of the side walls 1 of the cabinet for the insertion of additional sheets of ground glass, or other screens, 8' and the upper portion 17 of the front panel of the printer is preferably hinged on hinges 18 so that it may be lowered and the ground glass 8' removed or changed without disturbing the other elements of the printer.

The illumination unit of the printer is composed of an independent assembly in the form of a drawer, slidable in the cabinet of the printer. Suitable grooves are provided in the side members 4 and 4' of the drawer which slide on guideways 5 and 5' on the side walls 1 of the cabinet. The lamps required for printing, as well as other lamps required for inspection of the negative and the like, are mounted on the top 6 of this drawer, while the necessary switches and other controls for the lamps are mounted on the front panel 3 of the drawer. An electrical receptacle 46 is provided on the drawer so that an electric current may be supplied to the circuits controlled by the switches by merely inserting a plug in this receptacle through an opening provided for this purpose in the rear wall 2 of the cabinet. Thus when it is desired to remove the illumination unit from the printer, this is the only electrical connection which must be broken.

The lamps required for printing are all mounted on the top 6 of the illumination unit as illustrated in Fig. 2. These lamps are preferably arranged so that with the center light turned off, the other lights provide even illumination over the surface of the ground glass 8. A suitable arrangement of lights is illustrated in Fig. 3 in which 20 indicates lamps emitting actinic rays which are employed for printing and which preferably are argon lamps which emit a blue light and very little heat, while 21 designates red or other safe lights which may be employed while working around the machine with sensitized paper exposed, and 22 designates incandescent or other white lights which may be used for studying the negative to determine the necessary exposure time and "dodging" requirements. Each of lights 20 is preferably controlled by an individual switch 23, mounted on the front panel 3. In addition, all of the other necessary switches and other controls are also mounted on this front panel 3. Thus, as shown in the drawing, switch 24 is provided for closing the circuit to the lamps when the platen is raised in order to inspect the negative on the ground glass 8. A switch 25 may be employed to provide either automatic exposure control or timer control. A switch 26 may be provided to close the circuit to the lamp when the platen is closed and manual control is being employed for timing the exposure. A suitable timing mechanism and time control switches may be provided as illustrated at 27. A switch 26' may be provided for controlling the incandescent lamps employed for inspecting the negative. As illustrated in the drawings, the individual switches 23 for the individual lamps 20 are preferably so disposed on the front panel 3 in the same arrangement as the lamps are disposed on the plate 6, so that the operator can readily manipulate the lights in "dodging."

A central lamp 28, which emits actinic rays and may preferably be an argon lamp, is supported on socket 29 and is controlled by switch 30. The socket 29 is mounted on an elevator carriage 31, which may be raised and lowered on guide rods 32. These guide rods 32 are mounted on a disc 33 which, in turn, is supported by rods 34 from the top 6 of the drawer. An annular ring 35 is screwed to the top of guide rods 32 in order to retain the elevator carriage 31 on the guide rods 32. Spring 36 presses against disc 33 and elevator carriage 31, normally tending to raise the carriage. It should be noted that the lamp 28 and its mounting forms a complete sub-assembly which may be readily removed as a unit by removing the screws fastening rods 34 to the top 6 of the drawer. A flexible wire or other flexible connection 37 is secured to the socket 29 for the central lamp 28 and passes over suitable guide rollers 38 and 39 to a rotatable winding drum 40 to which it is secured. The drum 40 is mounted on shaft 41 which passes through the front panel 3 and is provided on its outer end with a knurled knob 42. The drum 40 is keyed or otherwise secured to the shaft 41 so as to rotate therewith and is longitudinally movable thereon so that by tightening lock nuts 43 on shaft 41, thereby compressing spring 44, the drum 40 presses the friction plate 45, mounted thereon, against friction plate 46, secured to the front panel 3, and thus sufficient frictional engagement is employed to hold the lamp 28 in whatever vertical position is desired. By rotating the knob 42 and consequently rotating the drum 40, the vertical position of the lamp 28 may readily be adjusted by the operator.

The operation of the printer described above is as follows: The negative to be printed is placed on the ground glass 8 and the switch 24 may be turned to the inspection position, thereby closing the circuit to all of the switches 23 and 30 of the lamps. Assuming that a negative taken with a wide angle lens and having an over-exposed portion near its center is to be printed, the switches 23, controlling the lamps 20, may be turned to the off position and the switch 30, controlling the central lamp 28, turned to its on position. The hinged upper portion 17 of the front panel may be opened by releasing latches 49 and the lower, or all, of the ground glass plates 8' removed. The front panel may then be closed and the operator can rotate the knob 42, thereby winding up or unwinding the wire 37 on the drum 40 and thus lowering or raising the central light 28 until the amount of light transmitted through the negative is substantially uniform over its entire area. If the over-exposed portion of the central part of the negative is quite large, the lamp 28 will be lowered until the cone of light from it is quite wide, whereas if the over-exposed portion is relatively small, the light 28 will be raised so as to provide a relatively small spot of high intensity light near the center of the negative substantially the same size as the over-exposed portion of the negative. The operator may also turn on such of lights 20, by means of switches 23, as are necessary to secure an even print. When the negative is suitably illuminated, the switch 24 may be turned to "Exposure" position, the switch 25 turned to "Timer control" position, thereby breaking the circuit to the lamps when the platen is raised, and the timer dial 27 set at the required exposure time. A piece of sensitized paper is then laid over the negative on top of ground glass 8 and the platen 9 lowered and locked in position by locking latch 11, thereby closing switch 13 and the circuit to the printing lamps through the timer. The circuit to the lamps will then be closed by the timer for the required exposure time and timer indicating light 50 will burn while the printing lamps are on. As soon as the circuit has been closed for the required exposure time, the circuit to the lamps will be broken by the operation of the timer and the lamps employed for printing as well as the indicator lamp 50 turned off, the operator can raise the platen by unlocking latch 11 and remove the exposed sensitized paper for development. A second negative may be brought into position over the ground glass 8 by unwinding film 16 from the roll 15 and the operation repeated, the lamps being adjusted as may be necessary for the particular negative to be printed. In the event that manual control of the printing time is employed, switch 25 will be set in manual position, thereby cutting out the timer and the circuit to the lamps controlled by operation of the switch 26 when it is desired to make a print and the switch 13 closed by the platen being locked in position.

The entire illumination unit may readily be removed from the cabinet for inspection or replacement of the lamps by removing the plug from the receptacle 48. Since all the switches and other control mechanism for the lamps are mounted on the front panel of the drawer containing the illumination unit, this is the only connection which must be broken and the unit may quickly be removed and any lamps replaced or other repairs made to the unit while it is readily accessible and without danger that it will be incorrectly wired when reinserted into the printer.

I claim:

1. A photoprinting apparatus comprising a support for a negative and sensitized paper, a platen mounted to move toward and away from said support to press the paper and negative, a lamp beneath the center of said support, a spring supporting said light, said spring normally urging said lamp towards said support, vertical guide means for said lamp adapted to maintain said lamp in position laterally while permitting vertical movement thereof, a flexible connector secured to said lamp, and retaining means for said flexible connector whereby said center lamp may be raised towards said support or lowered away from said support and held in position.

2. A photoprinting apparatus comprising a cabinet, a ground glass support for a negative and sensitized paper on the top of said cabinet, a platen mounted on said cabinet to move toward and away from said support to press the negative and paper, a drawer slidably insertable in said cabinet, a spring mounted on said drawer in the center thereof, a lamp mounted on said spring and normally urged towards said ground glass by said spring, vertical guide means for said lamp adapted to maintain said lamp in position laterally while permitting vertical movement thereof a rotatable drum mounted on the front panel of said drawer means for restraining rotation of said drum and a flexible wire connecting said central lamp and said drum whereby said lamp may be raised toward said support or lowered away from said support and held in position.

3. A photoprinting apparatus comprising a cabinet, a ground glass support for a negative and sensitized paper on the top of said cabinet, a platen mounted on said cabinet to move toward and away from said support to press the negative and paper, a drawer slidably insertable in said cabinet, a spring mounted on said drawer in the center thereof, a lamp socket mounted on said spring, guide rods extending vertically from said drawer surrounding said lamp socket and holding the same in position laterally while permitting vertical movement of the same, a rotatable drum mounted on the front panel of said drawer means for restraining rotation of said drum, a flexible connection between said lamp socket and said drum, a switch on said front panel for controlling the circuit to said lamp socket and an electrical connector on said drawer for connecting an outside source of electricity to said switch.

4. A photoprinting apparatus comprising a cabinet, a ground glass support for a negative and sensitized paper on the top of said cabinet, a platen mounted on said cabinet to move toward and away from said support to press the negative and paper, a drawer slidably insertable in said cabinet, a spring mounted on said drawer in the center thereof, a lamp socket mounted on said spring, guide rods extending vertically from said drawer surrounding said lamp socket and holding the same in position laterally while permitting vertical movement of the same, a rotatable drum mounted on the front panel of said drawer means for restraining rotation of said drum, a flexible connection between said lamp socket and said drum, a switch on said front panel for controlling the circuit to said lamp socket, a plurality of fixed position lamps on said drawer, a separate circuit to each of said lamps, an electrical connection on said drawer for connecting an outside source of electricity to all of said circuits and a switch in each of said circuits, mounted on the front panel of said drawer.

5. A photoprinting apparatus comprising a cabinet, a ground glass support for a negative and sensitized paper on the top of said cabinet, a platen mounted on said cabinet to move toward and away from said support to press the negative and paper, a drawer slidably insertable in said cabinet, a plurality of fixed position lamps on said drawer, a separate circuit to each of said lamps, an electrical connection on said drawer for connecting an outside source of electricity to all of said circuits and a switch in each of said circuits, mounted on the front panel of said drawer.

6. A photo-printing apparatus comprising a box-like cabinet, a transparent support for a negative and sensitized paper on the top of said cabinet, a platen mounted on said cabinet to move toward and away from said support to press the negative and paper, a drawer slidably insertable in said cabinet, said drawer comprising a plate-like horizontal member and a vertical front forming the front panel of said cabinet, a plurality of lamps arranged on said plate-like member, an electrical connection on said drawer adapted to be connected to a source of electric energy, circuit wiring from said connection to each of said lamps, an individual switch in said circuit wiring for each of said lamps, a control switch in said circuit wiring between said electrical connection and said individual switches, said control switch being mounted on the upper part of said front panel, means for operating said control switch and means on said platen for operating said control switch when the platen is in closed position, all of said circuit wiring being disposed in said slidable drawer.

7. A photo-printing apparatus comprising a box-like cabinet, a transparent support for a negative and sensitized paper on the top of said cabinet, a platen mounted on said cabinet to move toward and away from said support to press the negative and paper, screen-supporting means on the interior of the sides of said box-like cabinet immediately below said transparent support, a drawer-like member slidably insertable into said cabinet and comprising a horizontal plate-like member and a vertical front panel forming the front of said cabinet, the lower portion of said vertical member being held in fixed position at right angles to said horizontal plate-like member and the upper portion of said vertical member being hinged on the lower portion thereof, a plurality of lamps arranged on said plate-like member, an electrical connection arranged on said slidable drawer and adapted to be connected to a source of electric energy, circuit wiring from said electrical connection to each of said lamps, individual switches for each of said lamps on the lower fixed portion of said vertical front panel, a control switch in said circuit wiring between said electrical connection and said individual switches, said control switch being mounted on the upper hinged portion of said vertical front panel, and means on said platen for operating said control switch when said platen is in closed position, all of said circuit wiring being disposed on said slidably-insertable drawer.

LEW W. LESSLER.

REFERENCES CITED

The following references are of record in the file of this patent:

UNITED STATES PATENTS

| Number | Name | Date |
|---|---|---|
| 895,034 | McIntyre | Aug. 4, 1908 |
| 1,000,247 | Ferguson | Aug. 8, 1911 |
| 1,812,199 | Crayssac | June 30, 1931 |
| 2,200,719 | Morgan | May 14, 1940 |
| 2,228,642 | Robertson | Jan. 14, 1941 |
| 2,256,064 | Tupper | Sept. 16, 1941 |
| 1,015,750 | Welles | Jan. 23, 1912 |
| 1,652,964 | Walker | Dec. 13, 1927 |
| 2,371,594 | Hineline | Mar. 13, 1945 |
| 2,298,097 | Polhemus | Oct. 6, 1942 |
| 2,255,811 | Richards | Sept. 16, 1941 |
| 2,224,839 | Steiner | Dec. 10, 1940 |
| 1,486,867 | Dye | Mar. 18, 1924 |

FOREIGN PATENTS

| Number | Country | Date |
|---|---|---|
| 253,669 | Italian | July 1, 1927 |